US012031061B2

(12) United States Patent
Byrd

(10) Patent No.: US 12,031,061 B2
(45) Date of Patent: Jul. 9, 2024

(54) PAINT REMOVER

(71) Applicant: W.M. Barr & Company, Inc., Memphis, TN (US)

(72) Inventor: Alana Byrd, Memphis, TN (US)

(73) Assignee: W.M. Barr & Company, Inc., Memphis, TN (US)

( * ) Notice: Subject to any disclaimer, the term of this patent is extended or adjusted under 35 U.S.C. 154(b) by 400 days.

(21) Appl. No.: 16/905,047

(22) Filed: Jun. 18, 2020

(65) Prior Publication Data

US 2020/0399480 A1 Dec. 24, 2020

Related U.S. Application Data

(60) Provisional application No. 62/864,560, filed on Jun. 21, 2019.

(51) Int. Cl.
| | | |
|---|---|---|
| *C09D 9/00* | (2006.01) | |
| *C08K 3/22* | (2006.01) | |
| *C08K 5/05* | (2006.01) | |
| *C08K 5/06* | (2006.01) | |
| *C08K 5/09* | (2006.01) | |
| *C08K 5/3415* | (2006.01) | |
| *C08K 5/42* | (2006.01) | |
| *C09D 9/04* | (2006.01) | |

(52) U.S. Cl.
CPC ............... *C09D 9/005* (2013.01); *C08K 3/22* (2013.01); *C08K 5/05* (2013.01); *C08K 5/06* (2013.01); *C08K 5/09* (2013.01); *C08K 5/3415* (2013.01); *C08K 5/42* (2013.01); *C09D 9/04* (2013.01)

(58) Field of Classification Search
CPC . C09D 9/005; C09D 9/04; C08K 3/22; C08K 5/05; C08K 5/06; C08K 5/09; C08K 5/3415; C08K 5/42

See application file for complete search history.

(56) References Cited

U.S. PATENT DOCUMENTS

| | | | |
|---|---|---|---|
| 2,551,634 A | 5/1951 | Price | |
| 3,935,151 A * | 1/1976 | Nickerson | C09D 127/06 |
| | | | 428/483 |
| 4,854,973 A | 8/1989 | Holdar | |
| 5,308,527 A | 5/1994 | Lallier et al. | |
| 5,403,402 A | 4/1995 | LeGrow | |
| 5,744,437 A | 4/1998 | Rowe et al. | |
| 5,780,409 A | 7/1998 | Distaso | |
| 5,792,223 A | 8/1998 | Rivas et al. | |
| 6,159,915 A | 12/2000 | Machac, Jr. et al. | |
| 6,171,346 B1 | 1/2001 | Yeazell et al. | |
| 6,200,940 B1 | 3/2001 | Vitomir | |
| 6,395,103 B1 | 5/2002 | Machac, Jr. et al. | |
| 6,673,157 B1 | 1/2004 | McKim et al. | |
| 6,699,829 B2 | 3/2004 | Doyel et al. | |
| 6,833,345 B2 | 12/2004 | Machac, Jr. et al. | |
| 7,449,437 B2 | 11/2008 | Gross et al. | |
| 8,119,588 B2 | 2/2012 | Bernhardt et al. | |
| 8,309,502 B2 | 11/2012 | Quillen et al. | |
| 9,156,809 B2 | 10/2015 | Rieth et al. | |
| 9,455,447 B2 | 9/2016 | Thillaiyan et al. | |
| 9,458,414 B2 | 10/2016 | Rieth et al. | |
| 9,868,867 B1 | 1/2018 | Manley | |
| 10,717,885 B2 | 7/2020 | Morose | |
| 2004/0058832 A1 | 3/2004 | Shank et al. | |
| 2004/0058833 A1 | 3/2004 | Gross et al. | |
| 2006/0089281 A1 | 4/2006 | Gibson | |
| 2006/0258555 A1 | 11/2006 | Filippini et al. | |
| 2007/0101902 A1 | 5/2007 | Frees et al. | |
| 2007/0264175 A1 | 11/2007 | Iversen et al. | |
| 2008/0139437 A1 | 6/2008 | Power | |
| 2010/0104947 A1 | 4/2010 | Choi et al. | |
| 2010/0273696 A1 | 10/2010 | Hopfstock | |
| 2010/0276149 A1 | 11/2010 | Pope et al. | |
| 2011/0190187 A1* | 8/2011 | Hawes, III | C11D 7/263 |
| | | | 510/491 |
| 2012/0128614 A1 | 5/2012 | Rieth et al. | |
| 2015/0014223 A1 | 1/2015 | Fan et al. | |
| 2016/0040071 A1 | 2/2016 | Fan et al. | |
| 2017/0042784 A1 | 2/2017 | Munk et al. | |
| 2019/0106657 A1 | 4/2019 | Hawes et al. | |
| 2019/0169550 A1* | 6/2019 | Hunt, Jr. | C11D 3/10 |

(Continued)

FOREIGN PATENT DOCUMENTS

| | | |
|---|---|---|
| CH | 670832 A5 | 7/1989 |
| DE | 1621597 A1 | 5/1971 |
| DE | 19526351 B4 | 6/2005 |

(Continued)

OTHER PUBLICATIONS

International Preliminary Report on Patentability, PCT/US2020/038635, dated Dec. 21, 2021, 7 pages.
International Preliminary Report on Patentability of corresponding International Application PCT/US2018/038159, mailed on Dec. 24, 2019, all enclosed pages cited.
Extended European Search Report, European Application No. 18865466.9, dated May 25, 2021, 6 pages.
International Preliminary Report on Patentability for International Application No. PCT/US2018/054921, dated Apr. 14, 2020 (all enclosed pages cited).
International Search Report and Written Opinion for International Application No. PCT/US2018/038159, dated Sep. 6, 2018 (all enclosed pages cited).

(Continued)

*Primary Examiner* — Doris L Lee
(74) *Attorney, Agent, or Firm* — Shumaker, Loop & Kenderick, LLP

(57) ABSTRACT

A composition for paint or spot removal having a carrier, a chemical component selected from the group consisting of Tetraoxaundecane (TOU), N-Methyl-2-pyrrolidone (NMP), Diethylene Glycol Monobutyl Ether, Ethylene Glycol Phenyl Ether, Propylene Glycol Phenyl Ether, Dipropylene Glycol N-Butyl Ether, and a combination thereof, and a co-solvent. A method of using the composition to remove a stain or spot from a carpet or other non-porous or hard surface is provided.

9 Claims, No Drawings

(56) References Cited

U.S. PATENT DOCUMENTS

2019/0330481 A1  10/2019  Teague et al.
2020/0399480 A1  12/2020  Byrd

FOREIGN PATENT DOCUMENTS

| EP | 0 389 829 | * | 10/1990 |
|----|-----------|---|---------|
| WO | 03/062325 A2 | | 7/2003 |
| WO | WO 2015/133995 | * | 9/2015 |
| WO | 2018/039415 A1 | | 3/2018 |
| WO | 2018236782 A1 | | 12/2018 |
| WO | 2019168919 A1 | | 9/2019 |
| WO | 2020257581 A1 | | 12/2020 |

OTHER PUBLICATIONS

International Search Report and Written Opinion of International Application No. PCT/US2019/029368, dated Jun. 20, 2019 (all enclosed pages cited).
International Search Report and Written Opinion of corresponding application PCT/US2018/054921, mailed Dec. 14, 2018, all enclosed pages cited.
Octadecenoate—Wiktionary (Year: 2022).
International Preliminary Report on Patentability for PCT Application No. PCT/US2019/029368 dated Oct. 27, 2020 (all pages enclosed).
Supplementary European Search Report, European Application No. EP19793097, dated Feb. 22, 2022, 2 pages.
International Search Report and Written Opinion, PCT/US2020/038635, dated Sep. 28, 2020, 7 pages.

* cited by examiner

PAINT REMOVER

CROSS-REFERENCE TO RELATED APPLICATIONS

This application claims priority from U.S. Provisional Patent Application No. 62/864,560, filed on Jun. 21, 2019, in the United States Patent and Trademark Office. The disclosure of which is incorporated herein by reference in its entirety.

FIELD OF THE INVENTION

The present invention relates to a chemical composition for use as a paint or spot remover and to a method of using the chemical composition.

BACKGROUND OF THE INVENTION

Today the most effective paint clean-up remover contains acetone. This compound is extremely flammable and causes flash fires very quickly. There is a need to find safer, less hazardous compounds that causes little to no harm to the consumers.

SUMMARY OF THE INVENTION

The present invention relates to a paint or spot remover composition.

In an embodiment of the invention, the composition comprises: a carrier, a chemical component selected from the group consisting of Tetraoxaundecane (TOU), N-Methyl-2-pyrrolidone (NMP), Diethylene Glycol Monobutyl Ether, Ethylene Glycol Phenyl Ether, Propylene Glycol Phenyl Ether, Dipropylene Glycol N-Butyl Ether, and a combination thereof, and a co-solvent.

In an embodiment of the invention, a method of using is provided. The method comprises applying a chemical composition comprising a carrier, a chemical component selected from the group consisting of Tetraoxaundecane (TOU), N-Methyl-2-pyrrolidone (NMP), Diethylene Glycol Monobutyl Ether, Ethylene Glycol Phenyl Ether, Propylene Glycol Phenyl Ether, Dipropylene Glycol N-Butyl Ether, and a combination thereof, and a co-solvent to a surface having a paint or spot applied thereon; and removing the paint or spot from the surface with the composition.

In an embodiment of the invention, the surface to which the composition is applied is of a carpet or other non-porous surface such as a hardwood floor, among others.

Further areas of applicability of the present invention will become apparent from the detailed description provided hereinafter. It should be understood that the detailed description and specific examples, while indicating the preferred embodiments of the invention, are intended for purposes of illustration only and are not intended to limit the scope of the invention.

DESCRIPTION OF THE PREFERRED EMBODIMENTS

The following description of the embodiments of the present invention is merely exemplary in nature and is in no way intended to limit the invention, its application, or uses. The following description is provided herein solely by way of example for purposes of providing an enabling disclosure of the invention, but does not limit the scope or substance of the invention.

In an embodiment of the invention, a composition for use a paint remover is provided. The composition of the present invention comprises a component selected from the group consisting of Tetraoxaundecane (TOU), N-Methyl-2-pyrrolidone (NMP), Diethylene Glycol Monobutyl Ether, Ethylene Glycol Phenyl Ether, Propylene Glycol Phenyl Ether, Dipropylene Glycol N-Butyl Ether, and a combination thereof. Preferably, the composition comprises Tetraoxaundecane (TOU). An example of Tetraoxaundecane (TOU) is 2,5,7,10-Tetraoxaundecane.

The paint remover formulation comprises a co-solvent, preferably a low vapor pressure (LVP) solvent. Non-limiting examples of low vapor pressure (LVP) solvents include, but are not limited to, diethylene glycol monobutyl ether, benzyl alcohol, acetone, propylene glycol, ethylene glycol, DB acetate (Diethylene Glycol Monobutyl Ether Acetate), Hydrotreated Light Distillates (petroleum) (such as Calumet LVP 100), ethylene glycol phenyl ether, propylene glycol phenyl ether, Dibasic Ester (such as DBE-LVP), diglycolamine, methyl acetate, dipropylene glycol N-butyl ether, and combinations thereof.

In an embodiment of the invention, the paint remover composition meets volatile organic compound (VOC) laws which require 3% or less for a spot remover, as set by the California Air Resources Board (CARB).

The composition of the present invention may further comprise potassium hydroxide which may act as an alkaline activator for faster penetration and to aid in release of the paint from the surface. The composition of the present invention, may further comprise a surfactant. For example, sodium xylene sulfonate (SXS), fatty soaps (oleates), ethoxylated alcohols, sulfonates, and sulfates may be used as surfactants.

Other types of chemical components may be present in the chemical formulation include, but are not limited to, oleic acid, methyl soyate, and combinations thereof.

The composition achieves paint removal without the use of acetone or substantially free of acetone. Thus, the composition of the present invention is safer and non-flammable as compared to compositions that contain acetone. The composition may be used to clean up paint splatter on carpet or other non-porous surfaces including, but not limited to, hardwood floors.

The composition of the present invention removes paint including, but not limited to, latex paint, acrylic paint, and a combination thereof. There is a synergistic effect among the components of the composition.

EXAMPLES

TABLE 1

| Component | Weight Percent |
| --- | --- |
| Water | 70-90 |
| Diethyl Glycol Monobutyl Ether | 1-10 |
| Benzyl Alcohol | 1-10 |
| Oleic Acid | 0-10 |
| Methyl Soyate | 0-10 |
| Tetraoxaundecane (TOU) | 0.5-5 |
| Liquid Caustic Potash (45% active) | 0 to 5 |
| SXS (40% active) | 0 to 5 |

An example composition was prepared in accordance with the present invention having the following components:

Comparative Example 1

Blue latex paint (Valspar—Exterior Satin) was painted onto carpet and allowed to dry for 24 hours. Each formulation was sprayed 5 times and allowed to sit for 1 minute to penetrate the paint. The carpet was then scrubbed 10 times. Each formulation performance was given a rating of 1-5:
1=No Paint Removed
2=Little Paint Removed
3=Some Paint Removed
4=Most Paint Removed
5=All Paint Removed

TABLE 2

| Formulation | Performance Rating |
| --- | --- |
| TOU Paint Remover in accordance with invention | 4 |
| Comparative- No TOU | 3 |
| Comparative- No Glycol Ether | 3 |

The TOU paint remover was tested against other formulations to judge performance, and the results are set forth in Table 2.

Comparative Example 2

Red latex paint (Valspar—Satin) was painted onto carpet and allowed to dry for 24 hours. Each formulation was sprayed 5 times and allowed to sit for 1 minute to penetrate the paint. The carpet was then scrubbed 10 times. Each formulation's performance was given a rating of 1-5:
1=No Paint Removed
2=Little Paint Removed
3=Some Paint Removed
4=Most Paint Removed
5=All Paint Removed

TABLE 3

| Formulation | Performance Rating |
| --- | --- |
| TOU Paint Remover in accordance with invention | 4 |
| Competitor Form. 1: Krud Kutter | 3 |
| Competitor Form. 2: Goo Gone | 3 |
| Competitor Form. 3: Motsenbacker | 2 |

It will therefore be readily understood by those persons skilled in the art that the present invention is susceptible of broad utility and application. Many embodiments and adaptations of the present invention other than those herein described, as well as many variations, modifications and equivalent arrangements, will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements.

What is claimed is:

1. A paint remover composition consisting of:
   from 75 weight percent to 90 weight percent of a carrier;
   from 0.5 weight percent to 5 weight percent of tetraoxaundecane (TOU);
   from 1 weight percent to 10 weight percent of diethyl glycol monobutyl ether; and
   from 1 weight percent to 10 weight percent of benzyl alcohol;
   wherein the composition excludes acetone.

2. The composition according to claim 1, wherein the Tetraoxaundecane TOU) is 2,5,7,10-Tetraoxaundecane.

3. The composition according to claim 1, wherein the composition has less than 3% or less of volatile organic compound (VOC).

4. The composition according to claim 1, wherein the carrier is water.

5. A method of removing latex and acrylic paint from a painted surface comprising:
   applying, to the painted surface, a composition consisting of:
      from 75 weight percent to 90 weight percent of a carrier,
      from 0.5 weight percent to 5 weight percent of Tetraoxaundecane (TOU),
      from 1 weight percent to 10 weight percent of diethyl glycol monobutyl ether, and
      from 1 weight percent to 10 weight percent of benzyl alcohol, and
   removing the paint from the painted surface with the composition,
   wherein the composition excludes acetone.

6. The method according to claim 5, wherein the Tetraoxaundecane (TOU) is 2,5,7,10-Tetraoxaundecane.

7. The method according to claim 5, wherein the composition has less than 3% or less of volatile organic compound (VOC).

8. The method according to claim 5, wherein the carrier is water.

9. The method according to claim 5, wherein the surface is of a carpet or other non-porous surface.

* * * * *